United States Patent
Ainalem

(10) Patent No.: US 9,535,527 B2
(45) Date of Patent: Jan. 3, 2017

(54) PORTABLE ELECTRONIC DEVICE INCLUDING TOUCH-SENSITIVE DISPLAY AND METHOD OF CONTROLLING SELECTION OF INFORMATION

(71) Applicant: BlackBerry Limited, Waterloo (CA)

(72) Inventor: Mikael Ainalem, Malmö (SE)

(73) Assignee: BlackBerry Limited, Waterloo (CA)

( * ) Notice: Subject to any disclaimer, the term of this patent is extended or adjusted under 35 U.S.C. 154(b) by 24 days.

(21) Appl. No.: 14/625,373

(22) Filed: Feb. 18, 2015

(65) Prior Publication Data
US 2016/0239129 A1   Aug. 18, 2016

(51) Int. Cl.
*G06F 3/041* (2006.01)
*G06F 3/0488* (2013.01)

(52) U.S. Cl.
CPC .......... *G06F 3/0412* (2013.01); *G06F 3/0416* (2013.01); *G06F 3/0488* (2013.01); *G06F 2203/04104* (2013.01)

(58) Field of Classification Search
CPC  G06F 3/04883; G06F 3/0488; G06F 3/04842; G06F 2203/04808; G06F 2203/04805; G06F 3/0481; G06F 3/04886; G06F 3/0483; G06F 2203/04806; G06F 3/0482; G06F 3/0485; G06F 3/017
USPC ......... 345/156, 173, 174; 715/863, 784, 860
See application file for complete search history.

(56) References Cited

U.S. PATENT DOCUMENTS

| | | | |
|---|---|---|---|
| 8,650,507 B2 | 2/2014 | Westerman et al. | |
| 2009/0132957 A1* | 5/2009 | Reddy | G06F 3/0485 715/786 |
| 2009/0228792 A1* | 9/2009 | van Os | G06F 3/0488 715/702 |
| 2011/0191679 A1* | 8/2011 | Lin | G06F 17/30781 715/716 |
| 2014/0337799 A1 | 11/2014 | Zhong et al. | |

(Continued)

FOREIGN PATENT DOCUMENTS

| | | |
|---|---|---|
| EP | 2811386 A1 | 12/2014 |
| WO | 2013082689 A1 | 6/2013 |

OTHER PUBLICATIONS

Extended European Search Report dated Jul. 7, 2016, issued on corresponding EP patent application No. 16153963.0.

*Primary Examiner* — Koosha Sharifi-Tafreshi
(74) *Attorney, Agent, or Firm* — Borden Ladner Gervais LLP; Geoffrey deKleine

(57) ABSTRACT

A method of selecting information on a touch-sensitive display includes displaying the information on the touch-sensitive display, detecting a first touch at a first location on the touch-sensitive display, and identifying delimiters in the information displayed on the touch-sensitive display and displaying a graphical selection element including control delimiters that correspond to the delimiters identified in the information displayed. The method also includes, in response to detecting a second touch that begins at a second location associated with the graphical selection element and moves generally along the graphical selection element, identifying a nearest one of the control delimiters displayed in the graphical selection element to the second touch, and selecting information from the first location to one of the delimiters identified in the information displayed that corresponds to the identified nearest one of the control delimiters displayed in the graphical selection element.

15 Claims, 7 Drawing Sheets

(56) References Cited

U.S. PATENT DOCUMENTS

2014/0372934 A1* 12/2014 Pereira ................ G06F 3/04842
                      715/781

* cited by examiner

PORTABLE ELECTRONIC DEVICE INCLUDING TOUCH-SENSITIVE DISPLAY AND METHOD OF CONTROLLING SELECTION OF INFORMATION

FIELD OF TECHNOLOGY

The present disclosure relates to portable electronic devices including touch-sensitive displays.

BACKGROUND

Portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth® capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Improvements in devices with touch-sensitive displays are desirable.

BRIEF DESCRIPTION OF THE DRAWINGS

Embodiments of the present disclosure will now be described, by way of example only, with reference to the attached figures, in which.

DETAILED DESCRIPTION

Figure 1:
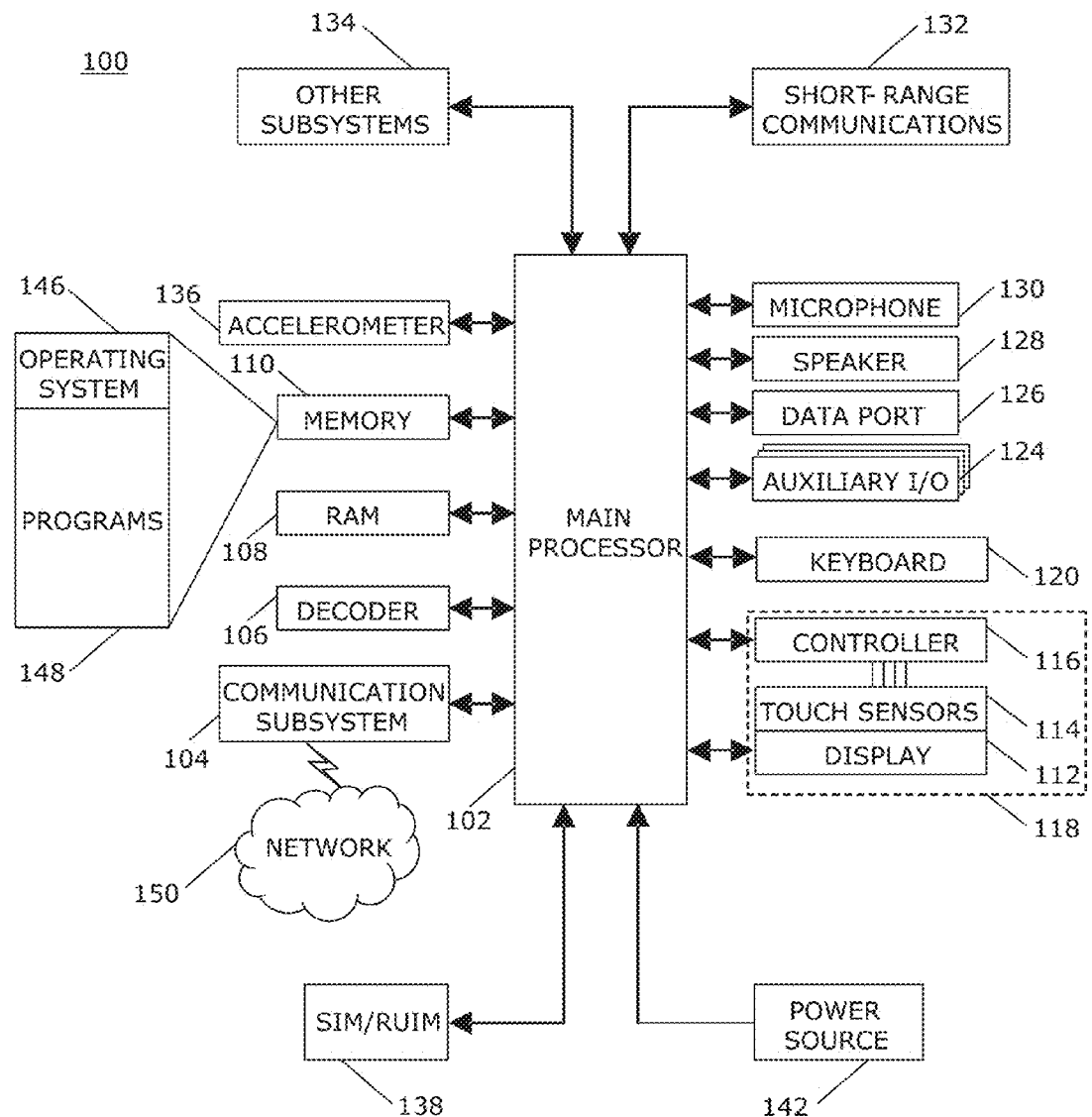
FIG. 1 is a block diagram of a portable electronic device in accordance with the present disclosure.

The following describes a portable electronic device and a method of controlling selection of information on a touch-sensitive display of the portable electronic device. The method includes displaying the information on the touch-sensitive display, detecting a first touch at a first location on the touch-sensitive display, and identifying delimiters in the information displayed on the touch-sensitive display and displaying a graphical selection element including control delimiters that correspond to the delimiters identified in the information displayed. The method also includes, in response to detecting a second touch that begins at a second location associated with the graphical selection element and moves generally along the graphical selection element, identifying a nearest one of the control delimiters displayed in the graphical selection element to the second touch, and selecting information from the first location to one of the delimiters identified in the information displayed that corresponds to the identified nearest one of the control delimiters displayed in the graphical selection element.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
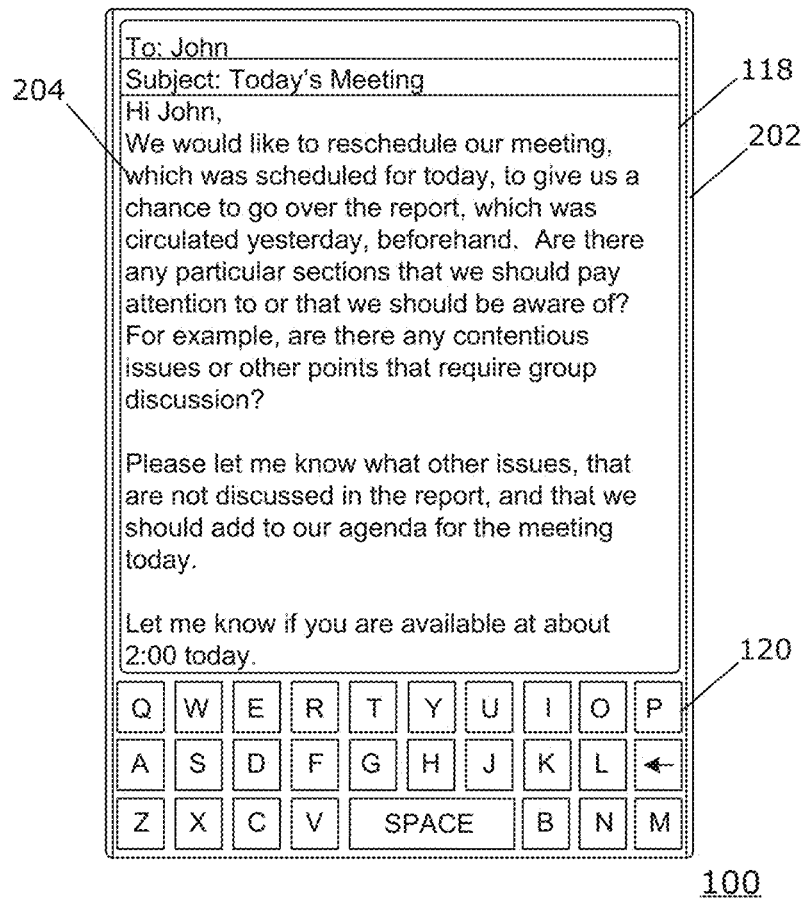
FIG. 2 is a front view of an example of a portable electronic device in accordance with the disclosure.

An example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1. The keyboard 120 is disposed below the touch-sensitive display 118 in the orientation illustrated in FIG. 2.

For the purpose of the example of FIG. 2, information 204 is displayed on the touch-sensitive display 118. The information 204 in this example is a message, such as an email message displayed on the touch-sensitive display 118. The email message may be a message received or a message composed utilizing the portable electronic device 100.

Figure 3:
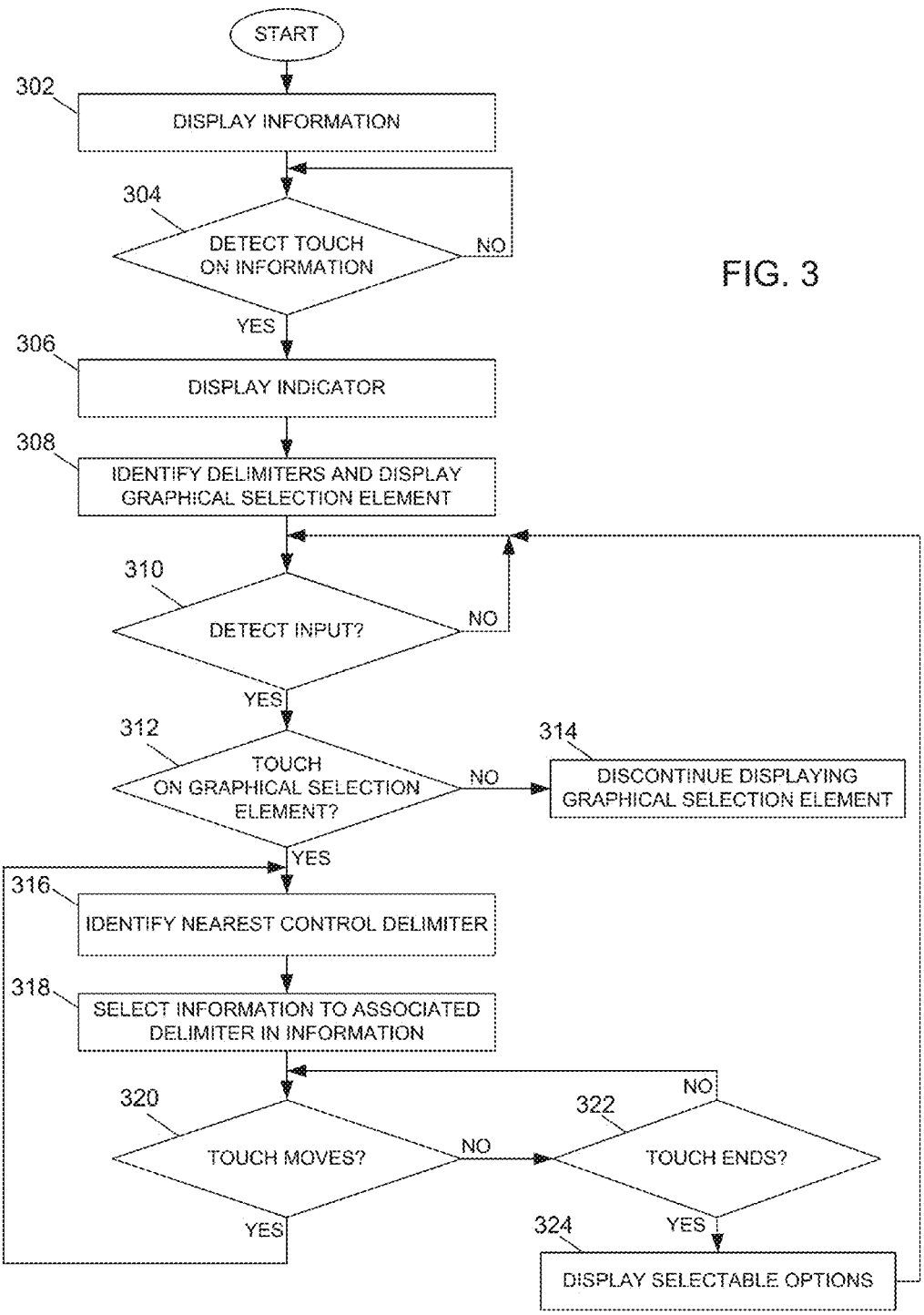
FIG. 3 is a flowchart illustrating a method of control of selection of information in accordance with the present disclosure.
Figure 4:
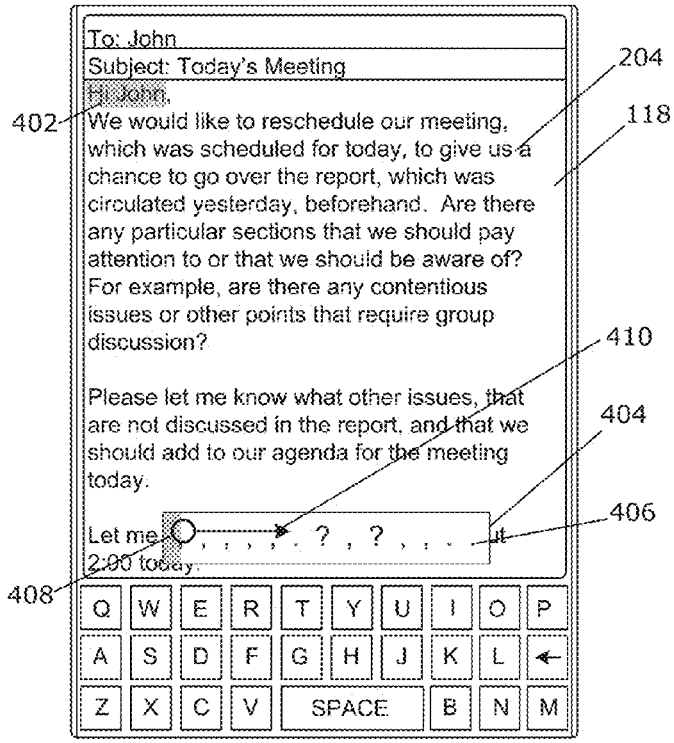
FIG. 4 through FIG. 11 illustrate examples of control of selection of information in accordance with the flowchart of FIG. 3.

A flowchart illustrating a method of controlling selection of information on a touch-sensitive display of a portable electronic device is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the portable electronic device 100 to perform the method may be stored in a computer-readable storage medium, such as a non-transitory computer-readable medium.

Information, such as text, is displayed 302 on the touch-sensitive display 118. The information may include text, characters, symbols, images, icons, and other items that may be displayed or rendered on a portable electronic device 118 in association with an application executed by the processor 102, such as, for example, an electronic mail, calendar, address book, word processor, Web browser, or other suitable application.

In response to detecting a touch on the touch-sensitive display 118 that meets a touch criterion or criteria at 304, the process continues at 306. The touch criteria may include a determination of whether or not the touch location is within the area in which the information is displayed and may include a comparison of contact time of the touch to a threshold period of time such that the touch meets the criteria when the touch contact meets the threshold period of time.

An indicator is displayed in the information that is displayed on the touch-sensitive display 118 at 306. The indicator may include a position marker such as a cursor, blinking bar, caret or any other marker displayed at a location in the information at which the touch is detected. Alternatively, the indicator may be a highlighted block of the information that is displayed. For example, a string, such as a word or words, closest to the location of the touch on the touch-sensitive display 118 may be highlighted.

Delimiters in the information are identified at 308 and a graphical selection element is displayed. The delimiters may include delimiters, such as, for example, punctuation marks, including, commas, periods, question marks, exclamation points or other punctuation marks. All punctuation marks in the information may be identified as delimiters or only sentence ending delimiters, such as periods, question marks, and exclamation points may be identified as delimiters. Optionally, the delimiters may include paragraph breaks or line breaks. Alternatively, the delimiters may include spaces between words.

The graphical selection element is a slider or bar displayed on the touch-sensitive display that is utilized to control the selection of information. Control delimiters, which correspond to the identified delimiters, are displayed along the graphical selection element. Thus, for each identified delimiter in the displayed information, a control delimiter is displayed along the graphical selection element. The control delimiter may be displayed adjacent to or within the graphical selection element. The control delimiters are displayed in the same order in the graphical selection element in which the corresponding identified delimiters are displayed in the information.

A threshold number of control delimiters may be displayed at any one time. Alternatively, the number of control delimiters may vary depending on the number of associated delimiters displayed in the information. The spacing between control delimiters and the font size of the control delimiters may be set or may vary. The number of control delimiters available for display is dependent on the number of associated delimiters displayed in the information. The size of the graphical selection element may be a set size such that the graphical selection element is always displayed at the same size, regardless of the number of control delimiters available for display. Optionally, the size of the graphical selection element may change depending on, for example, the number of control delimiters available for display.

In response to detecting an input at 310, the method continues at 312 and a determination is made whether the input is a touch is on the graphical selection element. When the input is not a touch that is associated with the graphical selection element, display of the graphical selection element is discontinued at 314. A touch is not associated with the graphical selection element when the touch is not on or near the graphical selection element. For example, when a touch is detected at a location on the touch-sensitive display 118, that is outside the area at which the graphical selection element is displayed, display of the graphical selection element is discontinued. Alternatively, when an input is received from a key of the keyboard 120, for example, when a key is depressed, display of the graphical selection element is discontinued.

In response to determining that the input is a touch on or near an area of the touch screen at which the graphical selection element is displayed at 312, the method continues at 316 and the control delimiter that is nearest to the location of the touch is identified at 316. Thus, for example, a linear distance between touch location and control delimiters may be determined and the nearest control delimiter to the touch is identified. The delimiter that is displayed in the information and that is associated with the identified nearest control delimiter is also identified and the information, beginning at the indicator and extending up to the associated delimiter displayed in the information, is selected at 318. The associated delimiter may also be selected or the selection of the associated delimiter may depend on where the touch location is in relation to the nearest control delimiter in the graphical selection element. For example, the associated delimiter may not be selected when the touch location is to the left of the control delimiter in the orientation in which the information is displayed. The associated delimiter may be selected when the touch location is on or to the right of the control delimiter in the orientation in which the information is displayed.

In response to determining that the touch location has changed, i.e., the touch has moved to a new location at 320, the method continues at 316 to identify the nearest control delimiter and select the information at 318. Thus, the graphical selection element acts as a slider for the selection of information displayed on the touch-sensitive display 118 and the selection is adjusted utilizing the slider. If the touch location has not changed at 320, the process continues at 322 and a determination is made whether the touch has ended. The touch is determined to have ended when the touch, which was previously detected on or near the graphical selection element, is no longer detected on the touch-sensitive display 118. If the touch has not ended, the method continues at 320.

In response to determining that the touch has ended at 322, selection options are displayed on the touch-sensitive display 324. The selection options are functions that may include, for example, an option to copy the selected text. The selection options may also include, for example, options to cut the selected text, or to paste over the selected text, or both cut and paste. The selection options may be dependent on the information, also referred to as context-sensitive. For example the cut and paste options may not be available when text is selected from a received message. The cut and paste options may be available, however, when text is selected in a composed message that is not yet sent.

In the present example, the method continues at 310 such that the selection of information may be controlled by another touch that is associated with the graphical selection element. Thus, the nearest one of the control delimiters may be again determined at 316 and the selection of information is adjusted by selecting the information to the associated delimiter in the information at 318.

Reference is made to FIG. 2 and FIG. 4 through FIG. 8 with continued reference to FIG. 3 to describe examples of the control of selection of information. For the purpose of the example shown in FIG. 4, the information 204 is displayed at 302, as illustrated in FIG. 2 and described above. A touch is detected on the portable electronic device 100 at 304. The touch is maintained for a period of time that at least meets the threshold period of time and a portion 402 of the information 204 is selected at 306, as illustrated by the highlighted portion of information in FIG. 4. Thus, in the present example, the indicator that is displayed in the information 204 is the selection of a block of text in the information. The delimiters that are displayed in the information 204 are identified and a graphical selection element 404 including associated control delimiters is displayed at 308. In the present example, the delimiters include punctuation in the information 204 and the associated control delimiters are displayed as the same punctuation in the same order in which the punctuation appears in the information.

Input is detected at 310 and the input is a touch. The touch is represented by the circle 408 on the touch-sensitive display 118. The touch is associated with the graphical selection element 404, as determined at 312 and, in response to detecting the touch associated with the graphical selection element 404 at 312, the nearest control delimiter is identified at 316 and the information up to the associated delimiter in the information 204 is selected.

Figure 5:
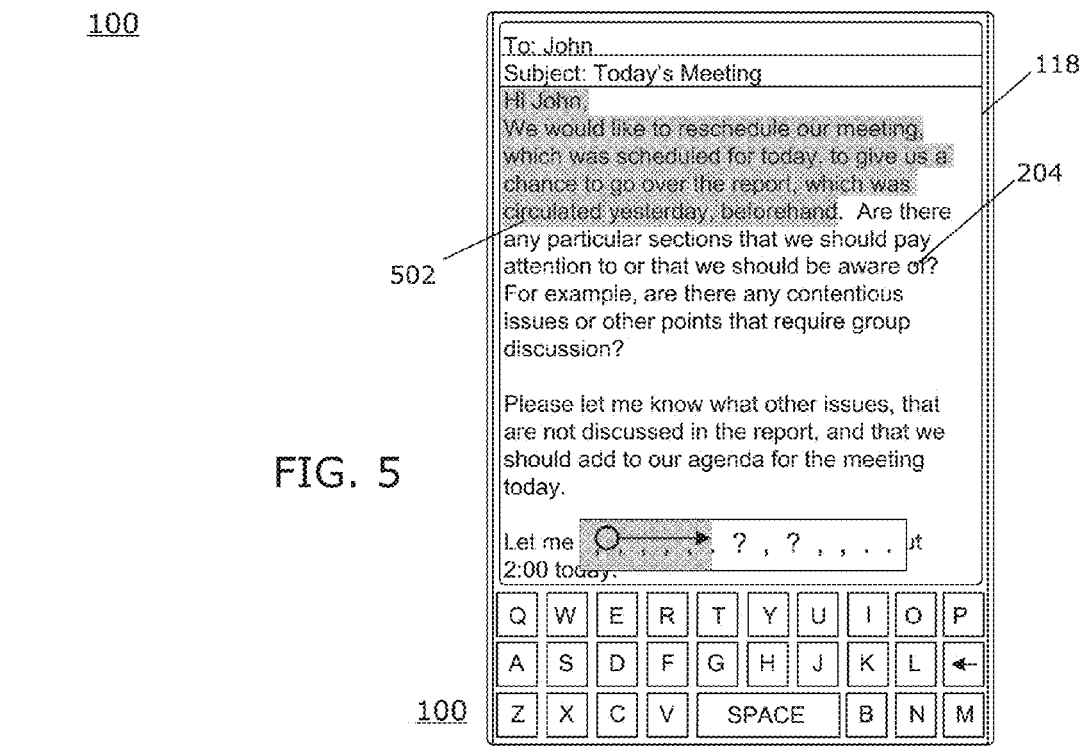
Figure 6:
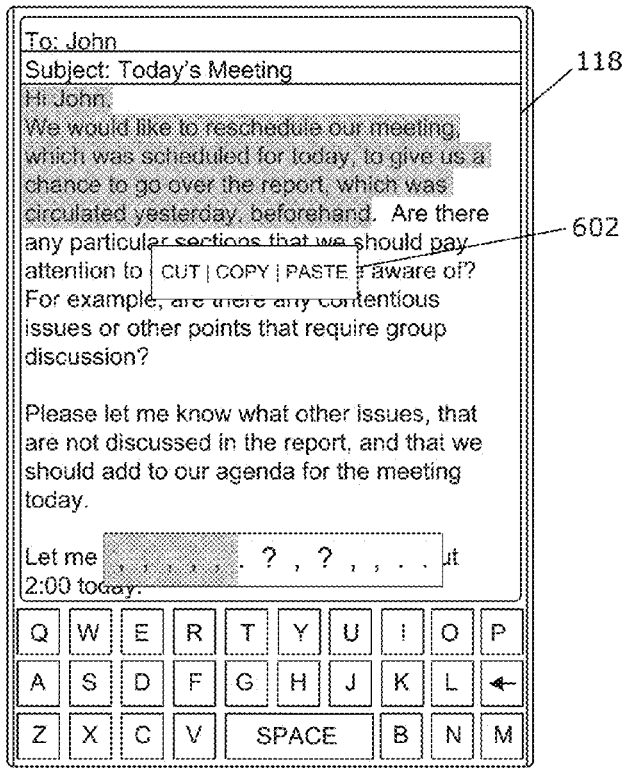

The touch in this example is a moving touch, as illustrated by the arrow 410, beginning at the start illustrated by the circle 408 and ending at the end point of the arrow 410. The movement of the touch is detected at 320 and nearest control delimiter is again identified at 316. The portion of the information 502 up to the associated delimiter in the information 204 is selected at 318, as illustrated in FIG. 5.

The touch ends at 322 and selectable options 602 are displayed on the touch-sensitive display 118 at 324. For the purpose of the present example, the selectable options 602 include options to cut the selected information, copy the selected information, and paste the selected information. Any one of the selectable options 602 may be selected by, for example, a touch on the option.

Continuing with the above example, another input is detected at 310 and the input is a touch. The touch is represented by the circle 702 on the touch-sensitive display 118 in FIG. 7. The touch is associated with the graphical selection element 404, as determined at 312 and, in response to detecting the touch associated with the graphical selection element 404 at 312, the nearest control delimiter is identified at 316 and the information up to the associated delimiter in the information 204 is selected.

Figure 7:
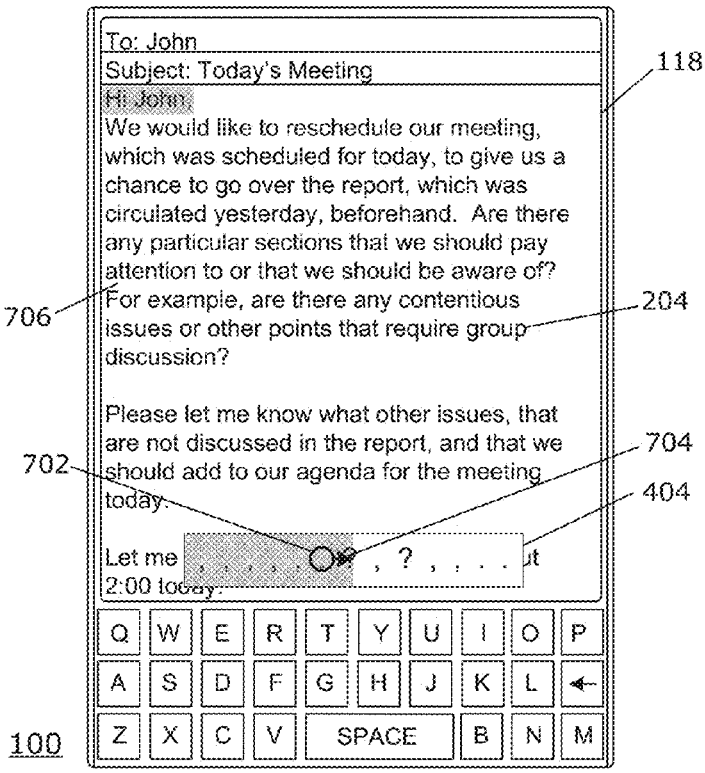

The touch in this example is a moving touch, as illustrated by the arrow 704, beginning at the start of the touch illustrated by the circle 702 and ending at the end point of the arrow 704. The movement of the touch is detected at 320 and the nearest control delimiter is again identified at 316. The portion 706 of the information 204 up to the associated delimiter in the information 204 is selected at 318, as illustrated in FIG. 7.

In the above examples, the touch moves from left to right to increase the amount of text selected. The touch may alternatively move from right to left to decrease the amount of text selected. In addition, when an indicator is displayed at 306 in response to a touch at a location between the beginning and the end of the information, control delimiters may be displayed on both sides of starting point on the graphical selection element, facilitating selection of information before as well as information after the indicator.

Figure 8:
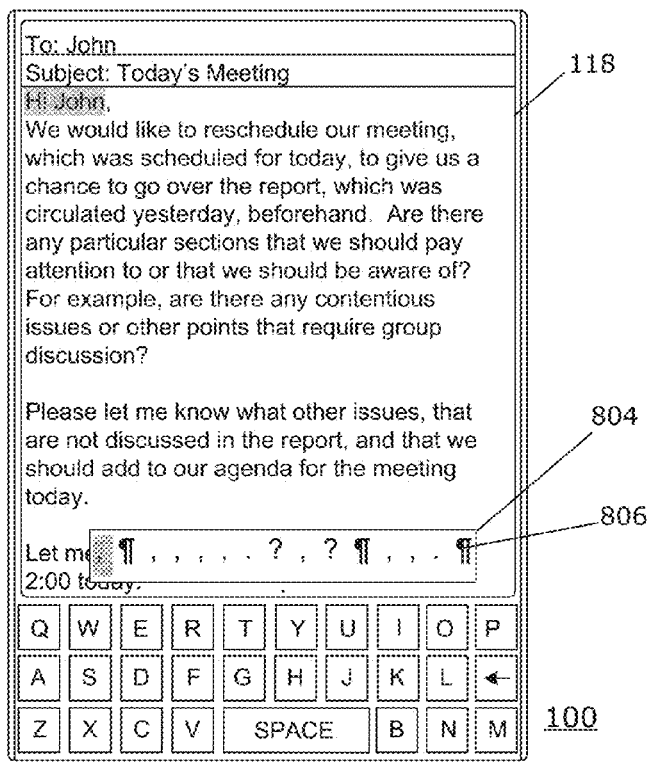

FIG. 8 shows another example of the control of selection of information. Many of the elements and the method of control are similar to the elements and method described above with reference to FIG. 4. In the present example, however, delimiters include paragraph breaks in addition to the punctuation. Thus, the graphical selection element 804 includes control delimiters 806 associated with the paragraph breaks.

Figure 9:
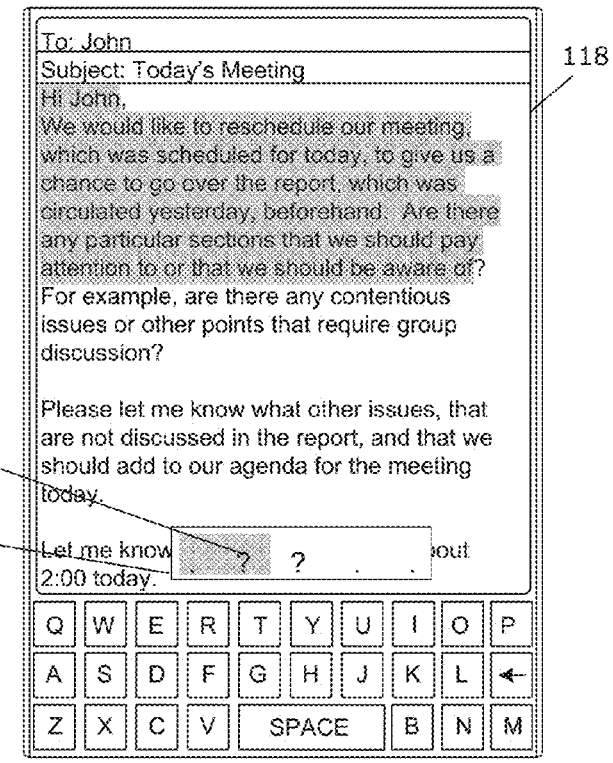

In the examples described above with reference to FIG. 4 through 8, all punctuation marks are identified as delimiters, including periods, commas, question marks, and exclamation points. Rather than including all punctuation marks, the control delimiters may include only sentence ending delimiters, such as periods, question marks, and exclamation points, as illustrated in FIG. 9. Thus, in the example of FIG. 9, the control delimiters do not include commas. Alternatively, the control delimiters may include only periods. The graphical selection element 904 includes control delimiters 906 associated only with sentence ending delimiters. According to another alternative, the control delimiters may include only paragraph breaks or line breaks.

Figure 10:
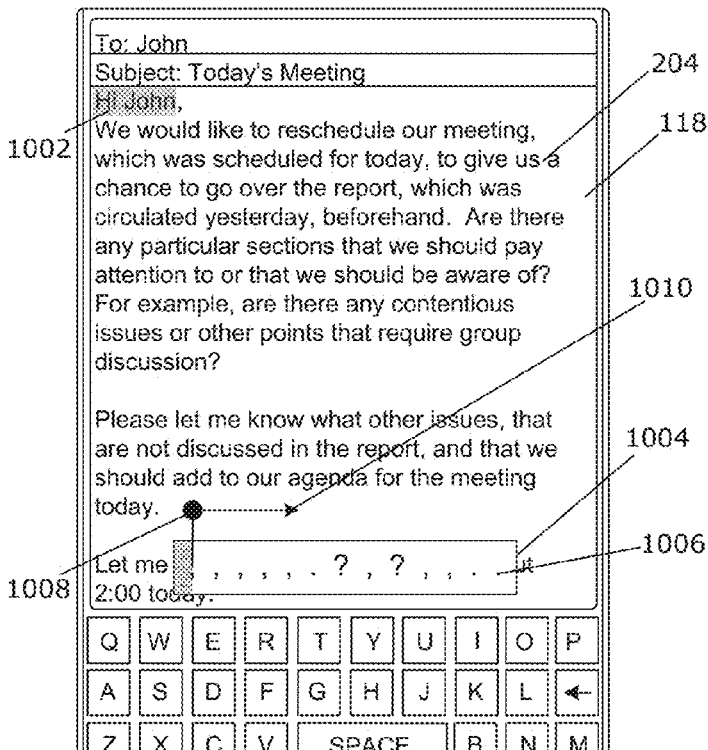
Figure 11:
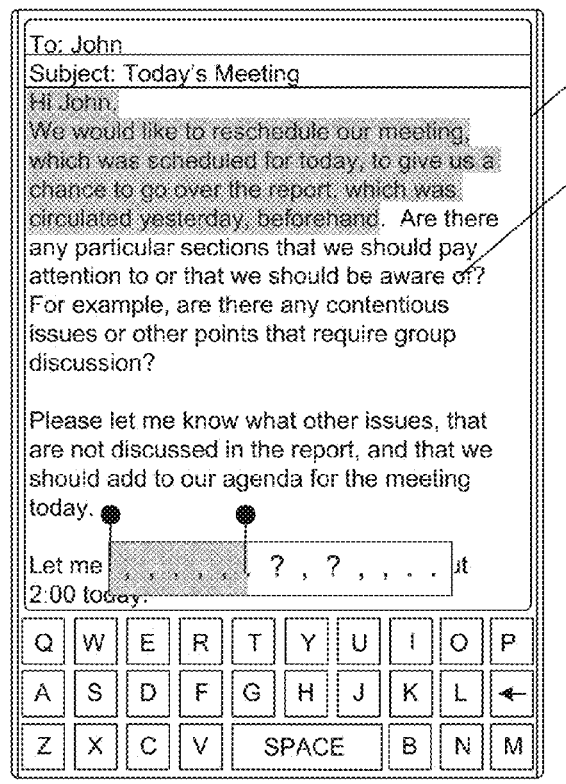

FIG. 10 and FIG. 11 show yet another example of the control of selection of information. Many of the elements and the method of control are similar to the elements and method described above with reference to FIG. 4 and to FIG. 5. In the example of FIG. 10 and FIG. 11, however, the control delimiters are displayed in a graphical selection element 1004 that includes at least one handle 1008 for selecting the information. The handle 1008 in FIG. 10 is displayed at the end of the selection within the control delimiters 1006 in the graphical selection element 1004.

For the purpose of the example shown in FIG. 10 and FIG. 11, the information 204 is displayed at 302, as illustrated in FIG. 2 and described above. A touch is detected on the portable electronic device 100 at 304. The touch is maintained for a period of time that at least meets the threshold period of time and a portion 1002 of the information 204 is selected at 306, as illustrated by the highlighted portion of information in FIG. 10. Thus, in the present example, the indicator that is displayed in the information 204 is the selection of a block of text in the information. The delimiters that are displayed in the information 204 are identified and the graphical selection element 1004 including associated control delimiters is displayed at 308. In the present example, the graphical selection element 1004 includes the handle 1008 that marks the end of the selection within the graphical selection element 1004. The handle 1008 is utilized for selecting the block of text in the information 204.

Input is detected at 310 and the input is a touch. The touch is a touch on the handle 1008 on the touch-sensitive display 118. The touch is associated with the handle 1008 and is therefore associated with the graphical selection element 1004, as determined at 312 and, in response to detecting the touch associated with the graphical selection element 1004 at 312, the nearest control delimiter is identified at 316 and the information up to the associated delimiter in the information 204 is selected.

The touch in this example is a moving touch, as illustrated by the arrow 1010, beginning at the handle 1008 and ending at the end point of the arrow 1010. The movement of the touch is detected at 320 and the handle 1008 is thereby dragged relative to the control delimiters 1006. The nearest control delimiter is again identified at 316 and the portion of the information up to the associated delimiter in the information 204 is selected at 318, as illustrated in FIG. 11.

In the example of FIG. 11, a second handle 1012 is displayed. Optionally, the second handle may be displayed and may be dragged relative to control delimiters to facilitate selection of the starting point of the block of text in the information. The use of a handle or handles facilitates viewing of the control delimiters 1006 as the touch is moved along the graphical selection element 1004 because the touch is slightly spaced from the control delimiters.

Advantageously, delimiters in the information are identified and are utilized to facilitate selection of information, such as text, for the purpose of making changes or corrections. A graphical selection element in the form of a slider or slide bar is utilized in conjunction with representations of the delimiters in the text facilitating touch selection of text based on the location of the touch on the slider relative to the representations of the delimiters, referred to as control delimiters. The graphical selection element may be displayed at a location on the touch-sensitive display 118 in which information is not displayed or at a location away from the starting point of a selection in order to reduce the chance of interfering with the user's view of the information during selection. Accuracy and speed of selection may be increased utilizing the graphical selection element in the above-described method.

The scope of the claims should not be limited by the preferred embodiments set forth in the examples, but should be given the broadest interpretation consistent with the description as a whole.

What is claimed is:

1. A method of controlling selection of information on a touch-sensitive display, the method comprising:
   displaying the information on the touch-sensitive display;
   detecting a first touch at a first location on the touch-sensitive display;
   identifying delimiters in the information displayed on the touch-sensitive display, wherein the delimiters comprise one or both of punctuation in the information and paragraph breaks in the information, and displaying a graphical selection element including control delimiters that correspond to the delimiters identified in the information displayed;
   in response to detecting a second touch that begins at a second location associated with the graphical selection element and moves generally along the graphical selection element:
      identifying a nearest one of the control delimiters displayed in the graphical selection element to the second touch; and
      selecting information from the first location to one of the delimiters identified in the information displayed that corresponds to the identified nearest one of the control delimiters displayed in the graphical selection element.

2. The method according to claim 1, comprising selecting a first portion of the information in response to detecting the first touch and wherein selecting the information comprises selecting information including the first portion of the information and the information from the first location to the one of the delimiters identified in the information.

3. The method according to claim 1, wherein detecting the first touch comprises detecting touch contact that meets a threshold period of time.

4. The method according to claim 3, wherein the graphical selection element is displayed in response to the touch contact meeting the threshold period of time.

5. The method according to claim 1, comprising displaying selectable options in response to detecting an end of the second touch.

6. The method according to claim 1, comprising discontinuing displaying the graphical selection element in response to detecting a third touch on the touch-sensitive display, at a third location, spaced from the graphical selection element.

7. The method according to claim 1, comprising in response to detecting a third touch that moves generally along the graphical selection element:
   identifying a nearest one of the control delimiters displayed in the graphical selection element to the third touch; and
   adjusting the selected information such that information is selected from the first location to a second one of the delimiters, identified in the information displayed, that corresponds to the identified nearest one of the control delimiters to the third touch.

8. A non-transitory computer-readable medium having computer-readable code stored thereon, the computer-readable code executable by at least one processor of a portable electronic device having a touch-sensitive display to cause the portable electronic device to:
   display information on the touch-sensitive display;
   detect a first touch at a first location on the touch-sensitive display;
   identify delimiters in the information displayed on the touch-sensitive display, wherein the delimiters comprise one or both of punctuation in the information and paragraph breaks in the information, and displaying a graphical selection element including control delimiters that correspond to the delimiters identified in the information displayed;
   in response to detecting a second touch that begins at a second location associated with the graphical selection element and moves generally along the graphical selection element:
      identify a nearest one of the control delimiters displayed in the graphical selection element to the second touch; and
      select information from the first location to one of the delimiters identified in the information displayed that corresponds to the identified nearest one of the control delimiters displayed in the graphical selection element.

9. A portable electronic device comprising:
   a touch-sensitive display; and
   a processor operably coupled to the touch-sensitive display to control the touch-sensitive display to:
      display information on the touch-sensitive display;
      detect a first touch at a first location on the touch-sensitive display;
      identify delimiters in the information displayed on the touch-sensitive display, wherein the delimiters comprise one or both of punctuation in the information and paragraph breaks in the information, and display a graphical selection element including control delimiters that correspond to the delimiters identified in the information displayed;
      in response to detecting a second touch that begins at a second location associated with the graphical selection element and moves generally along the graphical selection element:
         identify a nearest one of the control delimiters displayed in the graphical selection element to the second touch; and
         select information from the first location to one of the delimiters identified in the information displayed that corresponds to the identified nearest one of the control delimiters displayed in the graphical selection element.

10. The portable electronic device according to claim 9, wherein a first portion of the information is selected in response to detecting the first touch and wherein the information selected in response to detecting the second touch comprises the first portion of the information and the information from the first location to the one of the delimiters identified in the information.

11. The portable electronic device according to claim 9, wherein the first touch comprises touch contact that meets a threshold period of time.

12. The portable electronic device according to claim 11, wherein the graphical selection element is displayed in response to the touch contact meeting the threshold period of time.

13. The portable electronic device according to claim 9, wherein selectable options are displayed in response to detecting an end of the second touch.

14. The portable electronic device according to claim 9, wherein display of the graphical selection element is discontinued in response to detecting a third touch on the touch-sensitive display, at a third location, spaced from the graphical selection element.

15. The portable electronic device according to claim 9, wherein, in response to detecting a third touch that moves generally along the graphical selection element:
- a nearest one of the control delimiters to the third touch is identified; and
- the selected information is adjusted such that information is selected from the first location to a second one of the delimiters, identified in the information displayed, that corresponds to the identified nearest one of the control delimiters to the third touch.

\* \* \* \* \*